Nov. 9, 1965  H. NEVISON  3,216,049
CASTER
Filed June 15, 1964
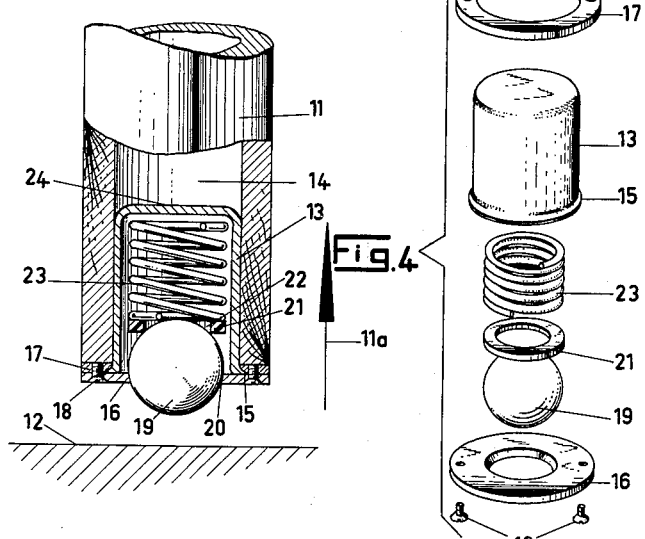
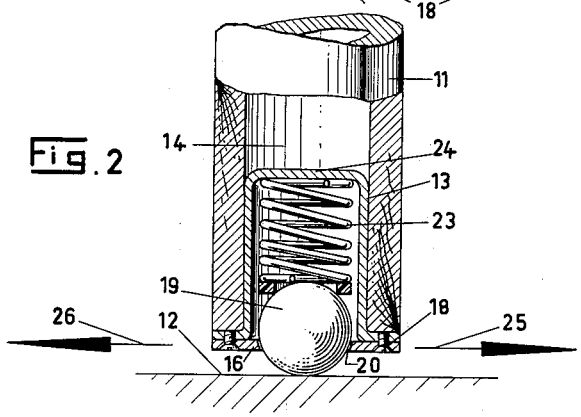
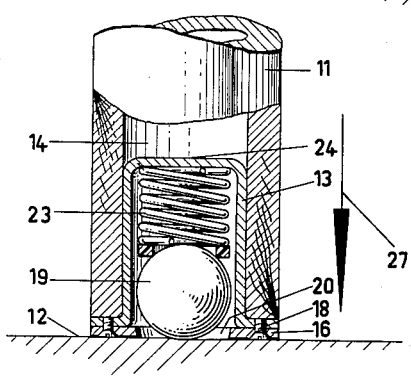
INVENTOR.
Harold Nevison Patented Nov. 9, 1965

3,216,049
CASTER
Harold Nevison, 148 Oak Park Ave., Toronto,
Ontario, Canada
Filed June 15, 1964, Ser. No. 374,916
1 Claim. (Cl. 16—44)

This invention relates to improvements in caster devices for use on various types of furniture and appliances and more particularly to ball caster devices incorporating low friction features.

It is conventional practice to provide furniture and the like with casters to facilitate moving such furniture over floors, etc., without having to contend with friction caused by sliding such conventional furniture across the floor and ensuing danger of scratching such floors. Such conventional casters have hitherto had the disadvantage that considerable friction is encountered in the caster itself due to the weight of the article to be moved in conjunction with extra pressure bearing on the ball of a ball caster derived from pre-loading of a spring contained in ball casters of conventional retractable type.

The friction encountered between ball and spring, due to such pre-loading, is often too great to permit the ball in the caster to roll easily around as furniture is moved.

This problem becomes quite considerable upon such casters being used in conjunction with heavy articles of furniture or appliances such as refrigerators, stoves and the like, a very heavy pre-loading of the spring on the ball of ball casters utilized in conjunction with such furniture or appliances normally being required in order to make the caster ball protrude in unloaded state for movement of the particular appliance, such heavy preloading providing excess friction that hitherto has prevented use of such retractable casters in conjunction with such heavy furniture or appliances.

It is therefore an object of the instant invention to provide a caster that enables furniture to be moved easily without any undue friction making this moving operation problematic.

It is a further object of this invention to provide a caster, utilizing a ball that will retract into the ball housing, upon weight being applied to the piece of furniture, thereby anchoring the furniture firmly on the floor in its location.

It is a still further object of this invention to provide a caster that in its non-loaded position, does not pressurize the ball in any way, but allows this to run freely.

It is a still further object of this invention to provide a caster having retractable characteristics incorporating a spring, the free length of the spring being smaller than the distance from the ball to the internal base of the ball housing, the spring being calibrated in strength according to the weight of the particular piece of furniture or appliance that is to be carried by the caster, a light spring being utilized for light furniture and a heavy spring being utilized for heavy furniture or appliances.

These and other objects and features of this invention will become apparent from the following description, taken in conjunction with the drawings in which:

FIG. 1 is a fractional, sectional side elevation of a furniture leg in which a caster, incorporating the present invention, has been installed, showing the caster in its unloaded position, the piece of furniture being suspended a distance above a floor.

FIG. 2 is a fractional, sectional side elevation of the caster illustrated in FIG. 1, showing the furniture leg located on a floor on the caster, without any extra load being located on the piece of furniture.

FIG. 3 is a fractional, sectional side elevation of the caster, illustrated in FIG. 1, showing the position of the caster ball, upon load having been located on the piece of furniture incorporating the leg.

FIG. 4 is an exploded perspective view of the various parts utilized in making up the caster shown in FIG. 1.

Referring to FIG. 1, a tubular leg 11, of a piece of furniture, is shown suspended in direction 11a above floor 12, a caster body 13 being shown inserted into hole 14 of leg 11, body 13 being supplied with a flange 15, that in this embodiment is sandwiched between an external washer 16 and a ring 17 fastened together by screw means 18.

A ball 19 is located within body 13, a hole 20, centrally of washer 16, being of smaller diameter than the diameter of ball 19, thereby permitting washer 16 to act as a retaining means for ball 19 within body 13.

A second washer 21 is located, freely movable, within body 13, washer 21 having a hole 22, permitting washer 21 to rest on top of ball 19. A helical spring 23 is located between washer 21 and closed end 24 of body 13, total length of spring 23 being slightly smaller than distance between washer 21 and closed end 24, thereby leaving an air space between spring 23 and end 24 upon furniture leg 11 being held in the shown suspended position.

Referring to FIG. 2, a furniture leg 11 of for instance a chair, is shown located on floor 12 without any further load being located on the chair spring 23 thereby being biased up against end 24 by ball 19, the only friction applied to ball 19 being that caused by the weight of the chair itself without any extra friction due to pre-loading of spring 23, since spring 23, as explained in FIG. 1, has no pre-loading force. Friction on ball 19 is thereby limited to that of the weight of the chair, transferred through a very small circular area, namely that defined by the contact area of hole 22, on ball 19, thereby permitting the furniture having leg 11, to be moved easily across a floor in direction 25 and 26 without ball 19 jamming through excess friction.

Referring to FIG. 3, leg 11 of the chair is shown in the position it will take after a person has located himself on the chair, ball 19 having retracted fully into body 13, permitting washer 16 to sit firmly down onto floor 12 in direction 27.

It may be seen, that the resilient means of my caster, illustrated as helical spring 23, may have any degree of compressibility according to the weight of the particular piece of furniture that this caster services. The illustrated helical spring 23, as seen in FIG. 3, may be of comparatively light character and therefore readily compressible when used for instance in conjunction with a chair, whereby a person sitting on the chair would by his weight, force the ball upwards into caster body 13, spring 23 however having sufficient strength to force ball 19 out of body 13 upon the person removing his weight from the chair and only the weight of the chair itself resting on the caster.

Spring 23 may however be made of very heavy calibre material for use in conjunction with, for instance, a refrigerator or the like, and may in fact become a substantially non-compressible member, the free length of spring 23 remaining of a size smaller than the greatest distance between ball 19 and closed end 24 of body 13 thereby permitting the weight of the unloaded refrigerator to be taken up by the spring and the biased ball 19 partly through hole 20 to facilitate moving of the refrigerator in unloaded condition.

It will be noted that only weight of the unloaded refrigerator will rest on ball 19, no extra pre-loading force of spring 23 being present to add further unnecessary and undesirable friction to rolling movement of ball 19.

It will be noticed that the aesthetic lines of leg 11 are not marred by any visible casters, yet upon removal of the person in the chair, the leg may easily be moved from place to place by rolling it on caster ball 19.

It will be noted that FIGS. 2 and 3 show a second method of utilizing my invention, body 13, in these figures being supplied with an extended flange that entirely replaces ring 17 of FIG. 1.

The general design of individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

A caster for furniture and the like, including a tubular body member, an end wall closing the upper end of said body member, a lower end of said body member being open and supplied with external flange means, a ball contained within said body member, a centrally perforated restraining washer extending across said open lower end, means retaining said washer onto said flange substantially coplanar with said lower end, said central perforation permitting said ball to extend therethrough, the diameter of said perforation being less than the diameter of said ball, a centrally perforated intermediate second washer having an outside diameter smaller than internal diameter of said tubular body member, and the ball contained within said tubular member, resilient means in the form of a helical compression spring inserted between said closed upper end of said body member and said second washer, said second washer being located between said resilient means and said ball, said resilient means having a total free length that is slightly less than the greatest distance between said second washer and said closed upper end of said body member, to keep said ball from having frictional resistance caused by contact with said centrally perforated restraining washer across said lower end said compression spring being held out of contact with the closed upper end of the body member when the furniture caster is not supporting furniture.

References Cited by the Examiner
UNITED STATES PATENTS

| | | | |
|---|---|---|---|
| 1,214,416 | 1/17 | Biddle | 16—26 |
| 2,808,607 | 10/57 | Urso | 16—24 |
| 2,819,486 | 1/58 | Dick | 16—44 |
| 3,096,536 | 7/63 | Rabelos | 16—24 |

JOSEPH D. SEERS, *Primary Examiner.*

DONLEY J. STOCKING, *Examiner.*